(12) United States Patent
Bosch et al.

(10) Patent No.: US 11,876,288 B2
(45) Date of Patent: Jan. 16, 2024

(54) MOBILE COMMUNICATIONS STATION

(71) Applicant: Deere & Company, Moline, IL (US)

(72) Inventors: Johannes Bosch, Rinnthal (DE);
Gerhard Huber, Clausen (DE); Jonas Schimpf, Enkenbach-Alsenborn (DE);
Susanne Brickenstein, Kaiserslautern (DE)

(73) Assignee: Deere & Company, Moline, IL (US)

( * ) Notice: Subject to any disclaimer, the term of this patent is extended or adjusted under 35 U.S.C. 154(b) by 304 days.

(21) Appl. No.: 17/463,076

(22) Filed: Aug. 31, 2021

(65) Prior Publication Data

US 2021/0399410 A1    Dec. 23, 2021

Related U.S. Application Data

(63) Continuation of application No. PCT/EP2020/055047, filed on Feb. 26, 2020.

(30) Foreign Application Priority Data

Mar. 1, 2019 (DE) ............. 10 2019 202 807.1

(51) Int. Cl.
*H01Q 1/32* (2006.01)
*B60D 1/01* (2006.01)
(Continued)

(52) U.S. Cl.
CPC .............. *H01Q 1/3216* (2013.01); *B60D 1/01* (2013.01); *B60D 1/48* (2013.01); *H01Q 1/1235* (2013.01); *H01Q 1/24* (2013.01); *A01B 59/066* (2013.01)

(58) Field of Classification Search
CPC ...... H01Q 1/3216; H01Q 1/1235; H01Q 1/24; H01Q 1/1264; H01Q 1/246; B60D 1/01; B60D 1/48; A01B 59/066; A01B 59/043
See application file for complete search history.

(56) References Cited

U.S. PATENT DOCUMENTS

| 7,642,987 | B2 |   | 1/2010 | Newman |
|---|---|---|---|---|
| 8,368,606 | B1 | * | 2/2013 | Haugan ............... H01Q 1/3216 343/912 |

(Continued)

FOREIGN PATENT DOCUMENTS

| DE | 19513251 | 10/1996 |
|---|---|---|
| DE | 102010003866 | 7/2011 |

(Continued)

OTHER PUBLICATIONS

International Searching Authority, "International Search Report", issued in connection with PCT Patent Application No. PCT/EP2020/055047, dated May 15, 2020, with English Translation, 5 pages.

(Continued)

*Primary Examiner* — Seung H Lee
(74) *Attorney, Agent, or Firm* — Hanley, Flight & Zimmerman, LLC

(57) ABSTRACT

A mobile communications station may include a supporting frame including an interface for mechanical coupling to a vehicle for transporting the mobile communications station, wherein the interface includes fastening points for attachment of a three-point hitch; a first antenna mounted on the supporting frame to facilitate communication with mobile devices; and a second antenna mounted on the supporting frame to facilitate communication with a distant location, wherein the first antenna and the second antenna are to facilitate a bidirectional communication link between the mobile devices and the distant location.

14 Claims, 3 Drawing Sheets

(51) Int. Cl.
  *B60D 1/48* (2006.01)
  *H01Q 1/12* (2006.01)
  *H01Q 1/24* (2006.01)
  *A01B 59/06* (2006.01)

(56) References Cited

U.S. PATENT DOCUMENTS

| | | | |
|---|---|---|---|
| 10,455,753 B2* | 10/2019 | Mollick | A01B 63/023 |
| 11,420,560 B2* | 8/2022 | Nishii | G05D 1/0044 |
| 2010/0142427 A1* | 6/2010 | Ramsey | H01Q 1/1235 |
| | | | 370/311 |
| 2011/0159401 A1 | 6/2011 | Chen et al. | |

FOREIGN PATENT DOCUMENTS

| | | |
|---|---|---|
| DE | 102014201203 | 7/2015 |
| EP | 1003238 | 5/2000 |
| WO | 2007136241 | 11/2007 |
| WO | 2014195891 | 12/2014 |
| WO | 2014195981 | 12/2014 |

OTHER PUBLICATIONS

International Searching Authority, "Written Opinion", issued in connection with PCT Patent Application No. PCT/EP2020/055047, dated May 15, 2020, with English machine translation, 14 pages.
International Searching Authority, "International Preliminary Report on Patentability," issued in connection with International Application No. PCT/EP2020/055047, dated Aug. 25, 2021, 16 pages. [English Translation Included].

* cited by examiner

MOBILE COMMUNICATIONS STATION

CROSS REFERENCE TO RELATED APPLICATION

This patent arises from an application that is a continuation of International Patent Application PCT/EP2020/055047, which was filed on Feb. 26, 2020, which claims priority to German Patent Application Serial Number DE 10 2019 202 807.1, which was filed on Mar. 1, 2019. DE Patent Application Serial Number DE 10 2019 202 807.1 and International Patent Application PCT/EP2020/055047 are incorporated by reference herein in their entirety.

TECHNICAL FIELD

The present disclosure relates to mobile communications and, more particularly, to a mobile communications station.

BACKGROUND

In agriculture, construction and forestry, the automation of machinery continues to progress. For people employed there, there is also a great need for information, to enable them to make decisions concerning work to be carried out. This information may, for example, concern data regarding certain properties of sensors that are required for controlling machines or corrective data for satellite-based location-determining receivers or any data regarding properties of a field or forest, or serve for purposes of communication or entertainment of a user of a mobile device.

Also, in building construction and civil engineering, modern, digitized information management systems are used, for example for so-called live tracking systems. Since it is not always the case that all data relevant to controlling machines or to human decision-making is available locally, (i.e., on a storage means of a machine controller or in a mobile device, such as a smartphone) or it is necessary for data to be transmitted to distant locations, there is a need to obtain bidirectional access to information sources and/or sinks by way of wireless connections, for example over the Internet. However, for reasons including cost, not all areas that are used for agriculture or forestry are covered by any kind of cellular (mobile) networks. Consequently, a wireless connection between machines or mobile devices and distant stations is not presently possible at all locations where such connections would be desirable, whether by means of customary mobile/cellular protocols or by using other protocols over any desired frequency bands, such as for example frequencies of the so-called ISM band (Industrial, Scientific and Medical Band).

Application WO 2007/136241 A1 shows mobile communications stations or towers including a supporting frame that stands on four feet that are adjustable in height to adapt to the contour of the terrain. Attached to the support frame are an extendable mast with antennas for radio-based communication with mobile devices and a satellite antenna to make communication possible between mobile devices and distant locations even in areas that are not otherwise accessible. Application WO 2007/136241 A1 does not describe exactly how the communications station is intended to be transported.

Application WO 2014/195891 A1 shows a similar communications station that is transported on a loading area of a truck. For transporting, the feet of the communications station are extended and the loading area of the truck is brought under the communications station. Although such vehicles can drive on normal roads, they cannot in all cases drive on relatively rough terrain that is used for purposes of agriculture, construction, or forestry.

BRIEF DESCRIPTION OF THE DRAWINGS

Examples that are described more specifically below are represented in the drawings, in which.

DETAILED DESCRIPTION

Figure 1:
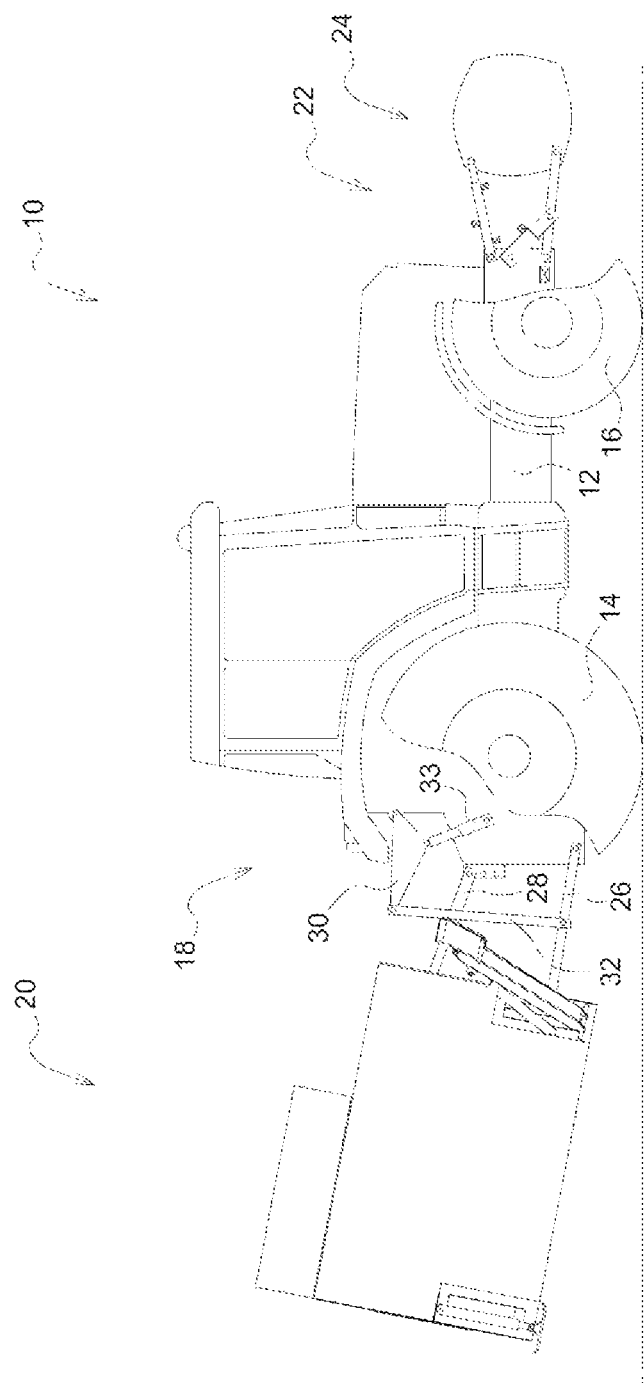
FIG. 1 shows an agricultural farm tractor when transporting a mobile communications station.

The present disclosure relates to mobile communications and, more particularly, to a mobile communications station including a supporting frame. In some examples, an antenna array for communication with mobile devices and communication means for communication with a distant location may be arranged on the supporting frame. The antenna array and the communication means may be, for example, intended for establishing a bidirectional communication link between the mobile devices and the distant location. The supporting frame may include an interface for mechanical coupling to a vehicle for transporting the mobile communications station.

As described herein, there is the possibility of using a farm tractor, or any other suitable piece of agriculture or construction equipment, to bring the communications station to areas that were not previously accessible, or only with difficulty, in a field, on a construction site, at an (opencast) mine or in a forest. For example, to facilitate transportation, the communications station may be attached to a front three-point hitch of a farm tractor, the tractor can at the same time take along at its rear interface an item of equipment for the work to be carried out.

In some examples, fastening points along the communications station may be arranged about midway along a side of the frame, so that asymmetrical loading of the three-point hitch is avoided.

The frame of the communications station can be covered with lateral coverings and/or upper coverings for transporting, or otherwise protecting, the communications station. The lateral coverings may be provided with an opening, through which the fastening points are accessible, wherein the opening may be formed between separate parts of the lateral covering or by a cutout. The opening may only extend in relatively narrow regions around the individual fastening points or correspond to the outline of the three-point hitch. It would also be conceivable that the fastening points of the mobile station protrude outwardly from the outline formed by it or by the coverings.

The supporting frame may include standing plates, which are attached to arms and can be moved by linear actuators between a retracted transporting position and an extended ground-engaging position. These arms can be pivoted by the linear actuators about horizontal axes, as shown in the figures, or adjusted in length (telescoped). The linear actuators may be activated by a controller for the purpose of automatically levelling the communications station.

For example, each corner of the frame may be assigned an arm, a linear actuator, and a standing plate, which in the transporting position are arranged within recesses of the frame or of the coverings and do not protrude beyond the contour of the communications station.

An antenna array may be fastened to a telescopic mast, which can be moved by a power-operated actuator or manually between a horizontal transporting position and a vertical operating position.

The communication means for wireless communication with a distant location may include a satellite antenna, which can be moved between a horizontal transporting position and an extended operating position and in the transporting position can be covered by a covering.

Attached to a mast of the antenna array may be an antenna for receiving signals of a satellite-based location-determining system, which serves for generating correction signals for location-determining systems, which can be sent via the antenna array to the mobile devices.

As described below, a mobile communications station is provided with a supporting frame, on which an antenna array for communication with mobile devices and communication means for communication with a distant location are arranged. The antenna array and the communication means are connected to one another by electronic components, which make it possible to establish a bidirectional communication link between the mobile devices and the distant location or a computer assigned to the communications station. The supporting frame has an interface in the form of fastening points for the attachment of, for example, a three-point hitch of a farm tractor, or any other suitable vehicle, for transporting the mobile communications station.

The example of FIG. 1 shows a conventional farm tractor 10, which is constructed on a supporting frame 12 and is supported on the ground by drivable, rear wheels 14 and steerable, front wheels 16. The farm tractor 10 includes a rear three-point hitch 18 and a front three-point hitch 22. The rear three-point hitch 18 includes two lower links 26, arranged laterally alongside one another, and an upper link 28, arranged thereabove. The lower links 26 are adjustable in height by a power lift with a hydraulic cylinder 33, which is connected to lifting arms 32 by means of a lever arrangement 30 supported on the frame 12. A front weight 24 is shown as attached to the front three-point hitch 22, which is likewise equipped with height-adjustable lower links.

A mobile communications station 20 is connected at the rear three-point hitch 18. The mobile communications station 20 is only supported on the farm tractor 10. In the example, of FIG. 1, the mobile communications station 20 does not include wheels, although such wheels could be included. While shown as attached to the rear three-point hitch 18 in FIG. 1, the communications station 20 could also be attached to the front three-point hitch 22, to transport an item of equipment by the rear three-point hitch 18 or some other interface on the rear side of the farm tractor 10.

Figure 2:
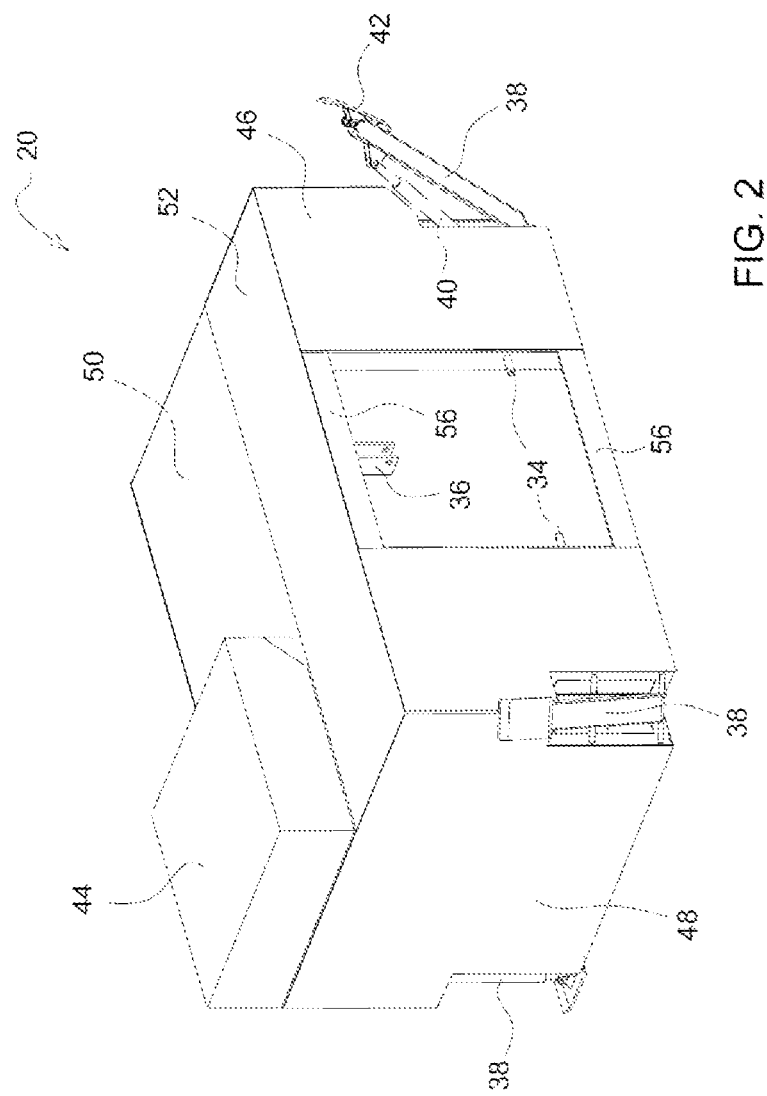
FIG. 2 shows a perspective view of the communications station in the transporting configuration.

An example of the communications station 20 is represented in FIG. 2 in its transporting configuration. The communications station 20 includes a supporting frame 56 that, in the example of FIG. 2, is covered on all sides by lateral coverings 46, 48. As shown in the example of FIG. 2, upper coverings 44, 50 may be used to cover top areas of the communications station 20. Of course, it is possible to leave some parts of the communications station, such as the mast 60 and/or the satellite antenna 58, partly or completely uncovered. On the side shown at the front in FIG. 2, the lateral coverings 46 are provided with a central opening, through which fastening points 34 and 36 attached to the frame 56 are accessible.

When transporting the communications station 20, the upper link 28 of the three-point hitch 18 is detachably coupled at the upper fastening point 36, which is attached to a horizontal cross-strut of the frame 56, and the lower links 26 of the three-point hitch 18 are detachably coupled at the lower fastening points 34, which are attached to vertical struts of the frame 56. Of course, the fastening points could be connected in other manners to the frame 56. As a result, it is possible to use the farm tractor 10 to bring the communications station 20 to any points in a field or forest that cannot be accessed by a truck, or only with difficulty.

In some examples, when the communications station 20 is attached to the front three-point hitch 22, an item of equipment can be transported by the farm tractor 10. The communications station 20 can accordingly be taken along when the farm tractor 10 or another machine is carrying out work on terrain that is difficult to access. It would also be possible to provide on the supporting frame 56 even more interfaces for transporting vehicles, for example for the fork of a forklift truck or wheeled loader. In addition, loading on trailers or transporting by air is of course also possible.

The communications station 20 shown in the examples equipped at each of its four corners with a foot, each of which includes an arm 38 and a standing plate 42 attached to the outer end of the arm by ball joints. The arms 38 are articulated on the frame 56 about horizontal pivot axes, which are angled away preferably at an angle of 45° with respect to the sides adjacent to the respective corner. An adjustment of the arms 38 takes place by hydraulically or electrically operated linear actuators 40. The actuators 40 make it possible to move the arms 38 between a transporting position, in which they extend upward and are located in corresponding recesses in the frame 56 and do not protrude outwardly beyond the remaining outer contour of the communications station 20, as represented in FIG. 2 by the arms 38 depicted on the left, and an extended operating position, in which the standing plates 42 are supported on the ground (in FIGS. 1 to 3, the arm 38 depicted on the right only extends out for purposes of illustration; in reality it would be upwardly and inwardly retracted into the transporting position, like the other arms 38). Instead of being pivotable, some or all the arms 38 may only be adjusted by the linear actuators 40 in the vertical direction (for example telescoped).

An automatic controller, which may form part of electrical components 74 (see FIG. 4) of the communications station 20, may be designed to activate the linear actuators 40 for the purpose of automatic levelling of the communications station 20, to horizontally align it automatically. In this case, for setting up the communications station 20, a first coarse alignment may be performed by the positionally adjustable three-point hitch 18 or 22, after which the linear actuators 40 bring the standing plates 42 into engagement with the ground. The three-point hitch 18 or 22 is then separated from the frame 56 (or it is hydraulically switched to a floating position) and finally the automatic controller causes the linear actuators 40 to perform the exact horizontal alignment of the communications station 20, and the three-point hitch 18 or 22 is detached from the frame 56, if this has not already happened. Re-attaching to the farm tractor 10 for transporting away takes place in the reverse sequence.

Figure 3:
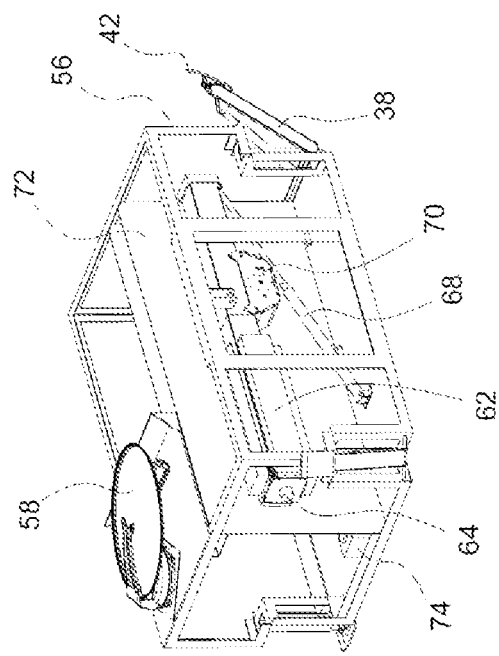
FIG. 3 shows a view of the communications station with removed coverings.
Figure 4:
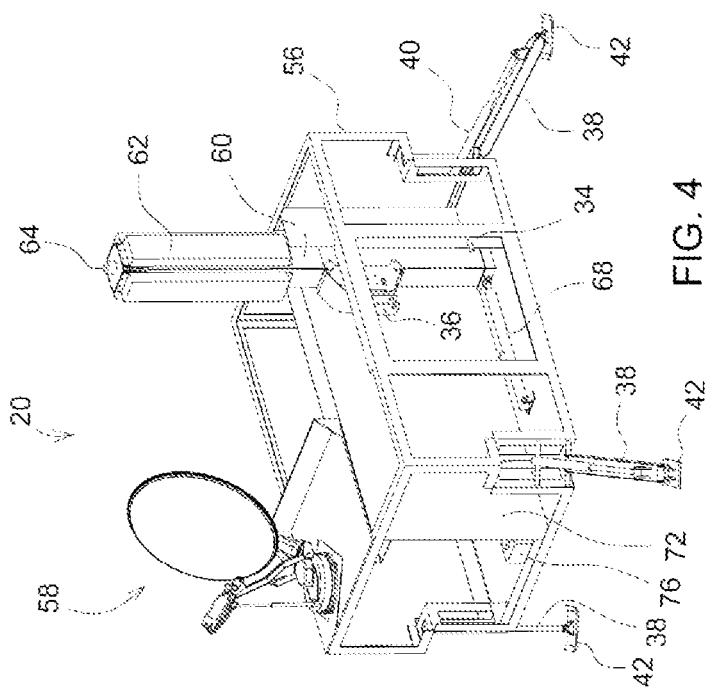
FIG. 4 shows a view of the communications station in the operationally ready state (apart from the retracted mast).

For the operation of the communications station 20, the coverings 46 to 50 may be completely or partly removed or swung away, as represented in FIGS. 2 to 4, which may take place manually or automatically by means of suitable actuators (not shown). They may be stowed on the inner side of the frame 56, for example in a cavity between the supporting frame and a dividing wall 72 of the frame 56 that is represented in FIG. 4. The covering 44 does not have to be raised with respect to the other upper covering 50 but could lie level with it (or be integrally formed with it) or be sunken with respect to it.

For wireless electromagnetic communication with mobile devices, the example communications station 20 includes an antenna array 62, which is attached to a telescopic and pivotable mast 60. Instead of the usual form shown, the antenna array 62 may also be configured as an omnidirectional antenna, a clip-on antenna or for example adhesively mounted antennas of any desired form. The mast 60 can be pivoted by an electrical or hydraulic linear actuator 68 (or by means of a manual drive, not shown) about a horizontal axis 70 between a horizontal stowing position (see FIG. 3) and a vertical operating position (FIG. 4). In the vertical operating position, the mast 60 can also be telescoped from the retracted position shown in FIG. 4 by a further linear actuator that is not shown (or manually by means of a suitable drive) into an extended position, to bring the antenna array 62 to a sufficient height for providing a sufficient range of communication with the mobile devices. Also attached to the tip of the mast 60 is an antenna 64 for receiving signals of a satellite-based location-determining system (GPS, Glonass, Galileo or the like). It serves, after calibration, for generating correction signals for location-determining systems ("RTK", real time kinematics), which can be sent to the mobile devices via the antenna array. The antenna array 62 can be used for emitting and receiving signals based on any desired protocols, for example for cellular mobile telephony (GSM, EDGE, UMTS, HSPDA, LTE, 5G etc.) or WLAN or other protocols or transmission technologies (Bluetooth, Zigbee etc.).

In addition, technical operating equipment may be attached to the mast 60, such as position lights or anemometers. Some of the transmitting and receiving units could alternatively also be attached at lower positions of the mast 60 or on the main body of the communications station 20. In the event of excessive wind load or bad weather, the mast 60 and/or the satellite antenna 58 could move back into a safe state of its own accord. If of a relatively great height or to achieve greater stability when there is a relatively great wind load, the mast 60 may be provided with bracing (for example cables). Instead of a mast 60, a tethered flying vehicle may also be used (cf. DE 10 2010 003 866 A1 and DE 10 2014 201 203 A1); the transmitting and receiving devices are in this case carried by the flying vehicle (cable copter) which is provided with a data and power connection by way of a cable. The cable copter can be launched from the space inside the communications station 20 and land in it again before the latter is transported.

Used to establish a communication link ("backbone") with a distant location, for example an (Internet) server, is a satellite antenna 58, which in the transporting position, in which it is lying flat (see FIG. 3), is upwardly covered by the box-shaped covering 44 (see FIG. 2). After the covering 44 has been removed (in particular manually), the satellite antenna 58 is erected by an automatic mechanism (see FIG. 4) and aligned with a suitable, geostationary, or moving communications satellite. This is ultimately how communication between the mobile devices and the distant station is established. In the case of another embodiment, an antenna attached to the mast 60 could be used instead of the satellite antenna 58 or in addition to it for a radio relay link, for example in the microwave range, or an optical communication path or, if available, a connection to a fiber-optic or other permanently laid communications network, if appropriate by using a connecting cable of a sufficient length.

The electrical or electronic functions of the communications station 20 are provided by the electrical components 74. The power supply to the communications station may be provided by batteries, which are backed up by solar cells and/or wind turbines, by motor-driven generators or fuel cells or by connection to existing power supply systems.

The example systems described herein relate to a mobile, semi-stationary, transportable communications station 20 that is autonomous, that is to say can be operated independently of a radio network, for supplying the surrounding area with telemetry services, public or private cellular mobile telephony, and further radio-based or connectivity-based transmission (broadcast) or data services. The example systems may be used wherever radio coverage by for example public cellular mobile telephony is not available, or only to a restricted extent, because of lack of area coverage of state or public network operators or because of particular topographical conditions. Consequently, the mobile communications station 20 can cover gaps in supply and it is possible to provide data services or smart services, such as the remote display of indicating devices (Remote Display Access) or preventive maintenance (Predictive Maintenance), which require a connection of low latency and high bandwidth. Operating safety-critical infrastructure, such as autonomous driving or operation of working machines and assemblies, such as automatic parallel operation of machines, supported by wireless communication, is thereby also made possible in an in a way that is virtually fail-safe. The integration of an edge cloud server (consisting of an industrial computer with a memory and a processor or a powerful computing unit that not only performs tasks of network management but also hosts applications and can perform artificial intelligence or machine learning operations) in the communications station 20, however, also allows the internal LTE/5G network to maintain its functionality even without an Internet connection as a private cellular mobile telephone network and to offer the users all services that run on the computer/server level of the edge cloud. The users are identified by SIM or ESIM in their mobile devices (cell phone, notebook, or vehicles) or other suitable methods of identification such as device numbers or hardware addresses. Roaming is technically possible.

In addition, the example communications station 20 may serve as a reference station for GNSS corrections. In areas in which the usual RTK radio signal cannot be received over the free frequency bands or else no MRTK can be received via cellular mobile telephony (such as LTE), there is the possibility of providing such a correction signal and allowing the use of RTK-based applications with extremely high precision. Transmission of correction signals (generated by means of the antenna 64 and/or received from a distant location via the satellite antenna 58) by means of Internet protocol is also possible.

The antenna array 62 for LTE may take the form of omnidirectional antennas, one or more sector antennas or else directional antennas of a wide variety of frequency bands; the receiving units may likewise consist of directional antennas or radio link antennas of various frequency spectra (5G/LTE, millimeter wave or frequencies of up to 26 GHz) and transmitting powers. The communications station 20 may additionally include units for receiving LoRa-WAN (LongRange-WideAreaNetwork), Sigfox, Zigbee, Bluetooth and comparable protocols or transmission technologies. In addition, sensors of machines or infrastructure that record data such as filling levels, movement, or position, may be integrated in a network or be made accessible to cloud applications. In this way for example logistical processes could be controlled. LoRA-WAN and the other technologies mentioned, such as Sigfox or Bluetooth, are possible technologies for interconnecting Internet of Things devices.

Areas of use include construction, agriculture, and forestry, especially to operate applications that require interconnection and Internet connection or computing power or AI functionalities fully comprehensively even in areas with no network coverage or poor network coverage. Another possible potential for use is in the construction industry, for mining companies, government and non-government organizations (NGOs) and search and rescue units (rescue and disaster control), such as civil defense, technical aid organizations (agencies providing technical relief) or firefighting services. Especially the construction industry, such as road and railroad construction, but also opencast mining operations require not only telecommunication services as such for positioning their vehicles and surveying work or structures but also extremely precise GPS systems. For this purpose, the described system can send receivable reference signals for the adjoining surrounding area at all locations in the world. All regions that do not have sufficient cellular mobile telephony coverage are typical areas of use for the invention. Likewise, regions in which existing infrastructure has been destroyed or overloaded can come into consideration as an area of use (earthquake zone, major events, refugee camps, humanitarian operations).

What is claimed is:

1. A mobile communications station comprising:
    a supporting frame including an interface for mechanical coupling to a vehicle for transporting the mobile communications station, wherein the interface includes fastening points for attachment of a three-point hitch;
    a first antenna mounted on the supporting frame to facilitate communication with mobile devices; and
    a second antenna mounted on the supporting frame to facilitate communication with a distant location, wherein the first antenna and the second antenna are to facilitate a bidirectional communication link between the mobile devices and the distant location.

2. The communications station of claim 1, wherein the fastening points are arranged about midway along a side of the supporting frame.

3. The communications station of claim 2, further including coverings attachable to the supporting frame.

4. The communications station of claim 3, wherein the coverings include a lateral covering including an opening, through which the fastening points are accessible.

5. The communications station of claim 1, wherein the supporting frame includes standing plates, which are attached to arms and can be moved by linear actuators between a retracted transporting position and an extended ground-engaging position.

6. The communications station of claim 5, wherein the linear actuators can be activated by a controller to perform automatic levelling of the communications station.

7. The communications station of claim 5, wherein an arm, a linear actuator, and a standing plate are associated with each corner of the supporting frame, wherein in the transporting position the arm, the linear actuator, and the standing plate are arranged within recesses of the supporting frame and do not protrude beyond a contour of the communications station.

8. The communications station of claim 1, wherein the first antenna is fastened to a telescopic mast, which can be moved between a horizontal transporting position and a vertical operating position.

9. The communications station of claim 1, wherein the second antenna comprises a satellite antenna, which can be moved between a horizontal transporting position and an extended operating position and in the transporting position can be covered by a covering.

10. The communications station of claim 1, wherein attached to a mast of the first antenna is a third for receiving signals of a satellite-based location-determining system, which serves for generating correction signals for location-determining systems, which can be sent via the first antenna to the mobile devices.

11. A mobile communications station comprising:
    a supporting frame;
    a first and second fastening points attached to the supporting frame;
    an upper fastening point attached to the supporting frame, wherein the first and second fastening points and the upper fastening point are for attachment of a three-point hitch;
    a mast pivotably coupled to the supporting frame;
    an arm having a first end and a second end, the first end pivotably coupled to the supporting frame;
    a standing plate attached to the second end of the arm; and
    a linear actuator attached to the supporting frame and the arm, wherein the arm can be moved by linear actuators between a retracted transporting position and an extended ground-engaging position.

12. The mobile communications station of claim 11, wherein the first and second fastening points and the upper fastening point are arranged about midway along a side of the supporting frame.

13. The mobile communications station of claim 12, further including coverings attachable to the supporting frame.

14. The mobile communications station of claim 13, wherein the coverings include a lateral covering including an opening, through which the pair of fastening points and the upper fastening point are accessible.

* * * * *